United States Patent
Obielodan, Jr. et al.

(10) Patent No.: US 12,247,325 B2
(45) Date of Patent: Mar. 11, 2025

(54) DEVELOPMENT OF BIO-COMPOSITE MATERIALS FOR 3D PRINTING USING MILK PROTEINS

(71) Applicant: WiSys Technology Foundation, Inc., Madison, WI (US)

(72) Inventors: John Obielodan, Jr., Platteville, WI (US); Tsunghsueh Wu, Platteville, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 768 days.

(21) Appl. No.: 17/342,803

(22) Filed: Jun. 9, 2021

(65) Prior Publication Data

US 2021/0381130 A1    Dec. 9, 2021

Related U.S. Application Data

(60) Provisional application No. 63/036,581, filed on Jun. 9, 2020.

(51) Int. Cl.
| | |
|---|---|
| *D01F 8/02* | (2006.01) |
| *B33Y 70/00* | (2020.01) |
| *C08J 3/20* | (2006.01) |
| *C08L 67/04* | (2006.01) |
| *C08L 97/00* | (2006.01) |
| *D01D 5/30* | (2006.01) |

(52) U.S. Cl.
CPC ............... *D01F 8/02* (2013.01); *B33Y 70/00* (2014.12); *C08J 3/20* (2013.01); *C08L 67/04* (2013.01); *C08L 97/005* (2013.01); *D01D 5/30* (2013.01); *C08J 2367/04* (2013.01); *C08J 2489/00* (2013.01); *C08L 2201/06* (2013.01); *D10B 2201/01* (2013.01); *D10B 2211/24* (2013.01); *D10B 2331/04* (2013.01); *D10B 2401/041* (2013.01); *D10B 2401/12* (2013.01)

(58) Field of Classification Search
CPC ........ D01F 8/02; D01F 6/625; C08L 2201/06; C08L 89/005; C08L 97/005
See application file for complete search history.

(56) References Cited

U.S. PATENT DOCUMENTS

2020/0254102 A1 *  8/2020  Andersen ............... A61K 47/36
2021/0171764 A1     6/2021  Obielodan et al.

FOREIGN PATENT DOCUMENTS

| CN | 105585830 A | * | 5/2016 | ............. B29C 48/05 |
| JP | 6311294 B2 | * | 4/2018 | |
| WO | 2020036638 | | 4/2019 | |

OTHER PUBLICATIONS

Gu et al (Polylactic acid composites incorporating casein functionalized cellulose nanowhiskers, Journal of Biological Engineering 2013, 7:31, published on Feb. 2013).*
Liu et al. "3D Printed Milk Protein Food Simulant: Improving the Printing Performance of Milk Protein Concentration by Incorporating Whey Protein Isolate", Innovative Food Science and Emerging Technologies 49 (2018) 116-126.

* cited by examiner

*Primary Examiner* — Gregory Listvoyb
(74) *Attorney, Agent, or Firm* — Boyle Fredrickson, S.C.

(57) ABSTRACT

A composite material includes biodegradable and/or renewable materials such as purified milk protein recovered as a byproduct in cheese making processes. The result is a material suitable for three-dimensional (3D) printing and extrusion based polymer processing, with improved properties but that is still environmentally friendly. Purified milk protein may be used to produce composite thermoplastic materials or resins. Additional chemical modification may improve the blending of purified milk protein.

12 Claims, 8 Drawing Sheets

DEVELOPMENT OF BIO-COMPOSITE MATERIALS FOR 3D PRINTING USING MILK PROTEINS

CROSS REFERENCE TO RELATED APPLICATION

This application claims the benefit of U.S. provisional application No. 63/036,581 filed Jun. 9, 2020, which is hereby incorporated by reference.

STATEMENT REGARDING FEDERALLY SPONSORED RESEARCH OR DEVELOPMENT

—

BACKGROUND OF THE INVENTION

The present invention relates to a composite thermoplastic material, and in particular, to a composite thermoplastic material to be used in three-dimensional (3D) printing and extrusion based polymer processing, e.g., injection molding applications.

Polymer three-dimensional printing otherwise known as additive manufacturing (AM) is a process of making a three-dimensional object by adding layers upon layers of material, such as plastic, metal, concrete, or the like, and using heat, chemical reaction, or phase transition to integrate the layers together.

Fused filament fabrication (FFF) techniques, also known as fused deposition modeling (FDM), heat thermoplastic filament to extrude the molten thermoplastic layer by layer. In particular, FFF techniques feed a continuous filament of thermoplastic material typically wound onto a coil through a heated printer extruder head that heats the filament material to its melting point and deposits the molten material onto a growing three-dimensional object. Alternatively, in fused pellets fabrication (FPF) and related techniques, thermoplastic pellets, particles, or powder are heated instead of filaments and extruded onto the growing three-dimensional object.

The molten material is extruded directly on a deposition plate or substrate layer-by-layer to form the three-dimensional object. The printer extruder head and/or deposition plate move in three dimensions under computer control to define the footprint of the printed shape and to provide stacked horizontal layers defining the three-dimensional object as understood in the art.

Many thermoplastic materials for the filament, pellets, particles or powder for FFF and FPF techniques are available for three-dimensional printing, each having their own trade-offs between strength, surface finish and post processing, thermal properties, and biodegradability. Common thermoplastic filaments or pellets used in three-dimensional printing include acrylonitrile butadiene styrene (ABS), polylactic acid (PLA), polycarbonate (PC), polyamide (PA), polystyrene (PS), milk protein, rubber, granular polyether ether ketone (PEEK), and the like known in the art.

ABS is a petroleum derived plastic that has high strength, flexibility and durability, but is prone to warping and is not biodegradable. PLA is made of organic material derived from renewable sources such as corn starch, tapioca roots, chips or starch, or sugarcane. It is easier to print with, provides greater detailed printing, and is more environmentally friendly than ABS. However, PLA has been found to be brittle and thermally instable.

Vat photopolymerization techniques utilize a vat of photopolymer resin that, when exposed to controlled lighting (e.g., an ultraviolet light laser), hardens through cross-linking driven by the addition reaction of carbon carbon double bonds in acrylates. Polymerization occurs when photopolymers are exposed to light when photopolymers contain chromophores, otherwise, the addition of molecules that are photosensitive are utilized to react with the solution to begin polymerization. Polymerization of monomers lead to cross-linking, which creates a polymer. Through these covalent bonds, the property of the solution is changed. Parts are fabricated using the process by selectively irradiating a surface on a build plate that is dipped into a resin vat. The irradiated layer of liquid resin is cured and transformed into a solid. The build plate then moves down in small increments equal to the layer height allowing liquid polymer resin to spread on its surface and is again exposed to light. The process repeats until the solid object has been built. The fabricated part is then removed from the build plate, washed and optionally cured using a curing oven. Alternatively, the build plate may initially maintain a gap between the plate and the floor of the vat equal to the layer height and the build plate may incrementally move up while the replenishing resin at the interface is cured.

Many photopolymer resins used with vat photopolymerization techniques consists of a photopolymerizable monomers, an initiator system (initiates polymerization upon exposure to light), reactive diluents, flexibilizers/plasticizers, and stabilizers.

Many companies have adopted three-dimensional printing technology to accelerate their product development process using, especially, polymer materials to establish form, fit, and function of the 3D printed structure. In many other cases, the technology is used for fabricating end-use parts for various applications. As a result, global demand for three-dimensional printing polymers has been rising steadily.

SUMMARY OF THE INVENTION

The present inventors have developed a polylactic acid (PLA) composite material to create lower cost yet environmentally friendly biodegradable three-dimensional (3D) printing filaments and pellets for fused filament fabrication (FFF) and fused pellets fabrication (FPF) techniques. The PLA composite material may also be used with extrusion based polymer processing. The present invention provides a PLA composite material that includes biodegradable and/or renewable materials such as milk proteins recovered as a byproduct of dairy processing waste.

Additionally, the present inventors have developed a photopolymer or photocurable liquid resin to create lower cost yet environmentally friendly biodegradable three-dimensional printing resin for vat photopolymerization process. The present invention provides a photocurable liquid resin that includes biodegradable and/or renewable materials such as milk proteins recovered as a byproduct of dairy processing waste.

Milk contains approximately 3.3% proteins, of which casein protein accounts for 80% and whey protein accounts for 20%. Casein is coagulated as a major component of cheese while the residual whey is normally discarded.

Milk proteins have been shown to provide many advantages in extrusion-based three-dimensional printing such as heat induced gelation property and rehydration. Namely, casein has been found to act as a dispersant for carbon nanofiber and cellulose in a PLA matrix, thus making it compatible for making three-dimensional printing bio composites. Water soluble whey can be modified to increase its hydrophobicity to also be compatible with PLA.

One source for casein is spoiled milk or bacteria contaminated milk, which are usually disposed to the environment with potential adverse effects. Therefore, a pathway for valorizing waste milk proteins in the production of bio-based engineering materials could stimulate future demand for milk and allow the conversion of spoiled/bacteria contaminated milk and other dairy products to useful marketable products. This approach has the potential to lower the environmental impact of dairy wastes, significantly reduce financial losses, and increase revenue for animal husbandry and the dairy processing industry.

Therefore, the present invention provides novel formulations and processing techniques for the making of successful homogenous dispersion and blending of diary based proteins casein and whey in PLA to produce filaments, pellets, or powder for three-dimensional printing using fused filament fabrication (FFF) and fused pellets fabrication (FPF) techniques. The process involves precipitation and possible chemical modification of milk proteins (casein and whey), blending of the proteins with PLA, and filament extrusion or pelletization for three-dimensional printing. Other potential applications include using casein or whey as important components of other three-dimensional printing technologies such as powder-bed fusion and vat photopolymerization processes.

One embodiment of the present invention provides a composition of a thermoplastic material having a first amount of purified polylactic acid and a second amount of purified milk protein blended in the purified polylactic acid where the purified milk protein is between 0.001 and 20 weight percent.

It is thus a feature of at least one embodiment of the present invention to provide an alternative composition for three-dimensional printing filaments and pellets that reduces the amount of polylactic acid and utilizes readily available milk proteins that are byproducts of cheese making processes.

The purified milk protein may be at least 5 weight percent and may be at least 10 weight percent.

It is thus a feature of at least one embodiment of the present invention to increase loading of milk protein within polylactic acid matrix thus improving the mechanical properties of the composite material while also balancing cost.

The purified milk protein may be casein or whey.

It is thus a feature of at least one embodiment of the present invention to utilize waste products that are readily available and commonly produced in cheese making processes.

The composition may further include a third amount of purified lignin. The purified lignin may be between 5 to 50 weight percent.

It is thus a feature of at least one embodiment of the present invention to improve the strength and lower the cost of the composite material.

The composition may be in the form of a filament, pellet, particle, or powder. The pellet, particle, or powder may have a diameter of less than 4.0 mm. The pellet, particle, or powder may have a diameter less than 3.0 mm. The pellet, particle or powder may have a diameter less than 2.0 mm.

It is thus a feature of at least one embodiment of the present invention to produce composite thermoplastic polymer materials with various shapes and sizes usable with pre-existing three-dimensional printing techniques.

The composition may be in the form of a filament. The filament may have a diameter of less than 3.0 mm. The filament may have a diameter of less than 2.0 mm. The filament may have a tensile strength of at least 20 MPa.

It is thus a feature of at least one embodiment of the present invention to produce a composite polymer that has good flowability and printability (based on factors such as oozing, warping, clogging, etc.) for filament extrusion.

The composition may be white, orange, brown, or black in color.

It is thus a feature of at least one embodiment of the present invention to produce a composite polymer that may be dyed to produce desirable colors for three-dimensional printing.

The composition may be composed of renewable materials.

It is thus a feature of at least one embodiment of the present invention to provide an environmentally benign polymer that is biodegradable and non-toxic to the environment.

The present invention also provides a manufacturing process for producing a polylactic acid and milk protein composite thermoplastic material for use in three-dimensional printing applications.

The present invention provides a method for producing a composition of a thermoplastic material including: mixing a first amount of purified polylactic acid with a second amount of purified milk protein blended in the purified polylactic acid where the purified milk protein is between 0.001% and 20 weight percent, and heating the composition of the first amount of purified polylactic acid with the second amount of purified milk protein blended in the purified polylactic acid to liquefy the composition.

It is thus a feature of at least one embodiment of the present invention to produce a homogenous and flowable composite thermal polymer for three-dimensional printing which prevents clogging within the printer nozzle.

The method may further include modifying purified milk protein by performing at least one of the following steps: (a) treating the purified milk protein with at least one of ninhydrin, acrylates, anhydrides, disulfides, epoxy, isocyanates, and alkyl halides, and (b) adding dialdehyde compounds to the purified milk protein. These steps add a modification reagent for modification of disulfide and amine functional groups in protein.

It is thus a feature of at least one embodiment of the present invention to improve bonding strength between polylactic acid and the purified milk protein to produce a stronger composition material for three-dimensional printing.

In an alternative embodiment, the present invention also provides a photopolymer resin and milk protein composite thermoplastic material for use in three-dimensional printing applications.

The present invention provides a method for producing and using a composition of a thermoplastic material including: mixing a first amount of photopolymer resin with a second amount of purified milk protein blended in the purified photopolymer resin where the purified milk protein is between 0.001 and 20 weight percent and placing the composition of the first amount and second amount in a vat for vat photopolymerization three-dimensional printing processes.

It is thus a feature of at least one embodiment of the present invention to use purified milk protein in vat photopolymerization three-dimensional printing processes as a less expensive material substitute for photopolymer resin with similar printing results.

These particular objects and advantages may apply to only some embodiments falling within the claims and thus do not define the scope of the invention.

DETAILED DESCRIPTION OF THE PREFERRED EMBODIMENT

Figure 1:
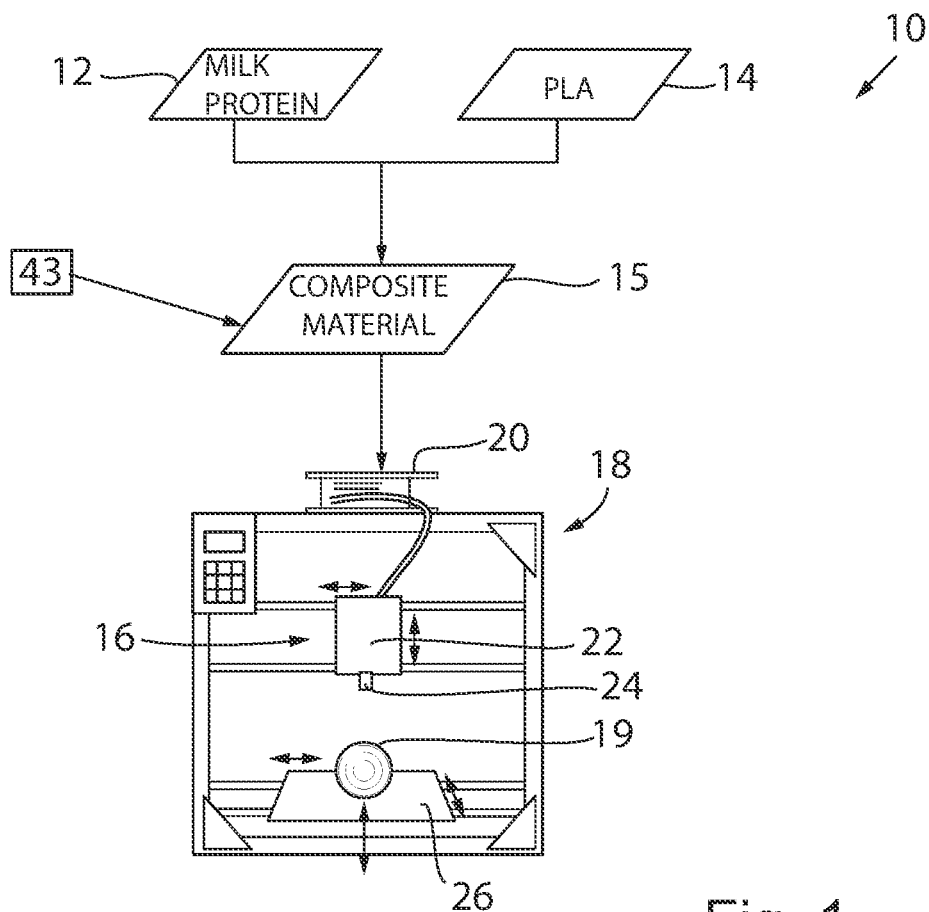
FIG. 1 is a schematic representation of a polylactic acid and purified milk protein composite material in accordance with the present invention for use with a three-dimensional printing method.

Referring to FIG. 1, a three-dimensional (3D) printing system 10 may utilize a milk protein 12, for example, casein and whey, recovered as a byproduct of dairy processing waste as will be further described below with respect to FIG. 2, with polylactic acid (PLA) 14 to produce a composite thermoplastic material 15. The resultant composite thermoplastic material 15 may take the form of filaments, pellets, particles, powder and the like which may then be used, for example, by a printer extruder 16 of a three-dimensional printer 18 for forming a three-dimensional printed object 19 using, for example, fused filament fabrication (FFF) and fused pellets fabrication (FPF) techniques.

Generally, the three-dimensional printer 18 is a computer controlled system having a feeding system for storing and feeding the composite thermoplastic material 15 to a motion system containing an extruder, nozzle and moving platform. The three-dimensional printer 18 may be powered by a stepper motor.

The composite thermoplastic material 15 may be fed into the printer extruder 16 in the form of filaments 56 or in the form of pellets 60, 90. In one embodiment, the composite thermoplastic material 15 may in the form of filaments 56 be fed from a spool 20 into the printer extruder 16 which melts the composite thermoplastic material 15 using an internal heater of an extruder head 22 and extrudes the molten material out of a nozzle 24, which is modifiable in size, onto a deposition plate 26 supporting the growing three-dimensional printed object 19. The nozzle 24 may be movable along the z-axis and the deposition plate 26 may be movable along the x-axis and y-axis.

The three-dimensional printer extruder parameters, such as extrusion temperature, may be modified according to the blend of the composite thermoplastic material 15. For example, three-dimensional printer extrusion temperature range of 170-230 degrees Celsius may be used for 0.001-20 wt % milk protein loading in PLA. Other three-dimensional print parameters may be adjusted based upon the composite thermoplastic material 15 blend including extrusion speed, printer nozzle diameter, nozzle temperature, substrate temperature, deposition speed, layer thickness, hatch pattern, and hatch spacing.

The composite thermoplastic material 15 may be used to print three-dimensional objects, as understood in the art with respect to fused filament fabrication (FFF)/fused deposition modeling (FDM) or fused pellets fabrication (FPF) techniques.

Figure 2:
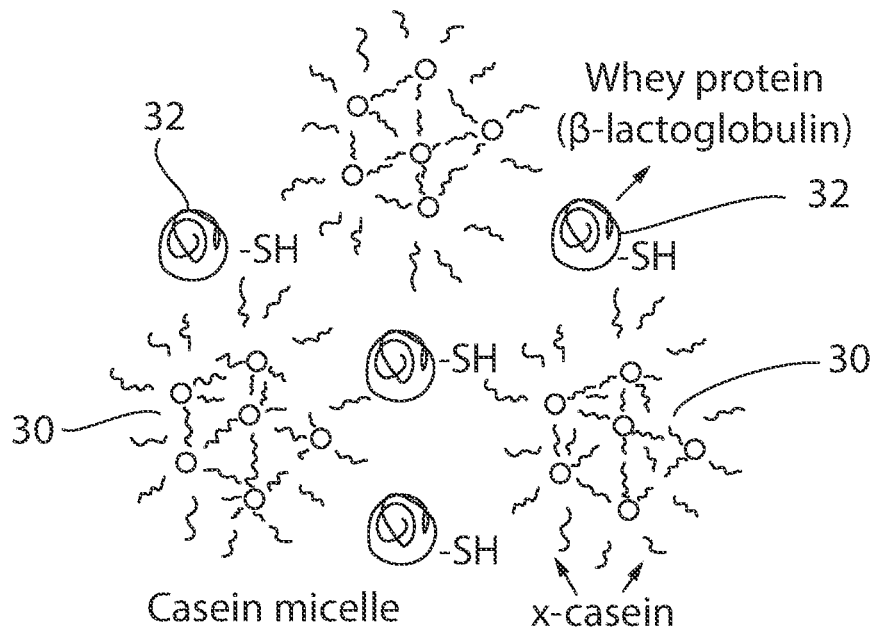
FIG. 2 is a schematic representation of casein protein and whey protein molecules, milk protein byproducts, used in the manufacture of the composite material of FIG. 1.

Referring to FIG. 2, casein proteins 30 and whey proteins 32 are byproducts of cheese production and are found in spoiled or bacteria contaminated milk. During cheesemaking, special enzymes or acids are added to heated milk.

These enzymes or acids cause the casein 30 in the milk to coagulate, or change to a solid, separating from the liquid substance.

The milk proteins casein 30 and whey 32 may be harvested from spoiled milk or bacteria contaminated milk, which are usually disposed of by farms and milk processors. The liquid substance is the whey protein 32 that can be washed and dried into powdered form. The solid curds of casein protein 30 can be washed and dried to also create a protein powder.

The extracted milk protein 12 may be employed in the composite thermoplastic filament or pellet material productions as further described below.

Figure 3:
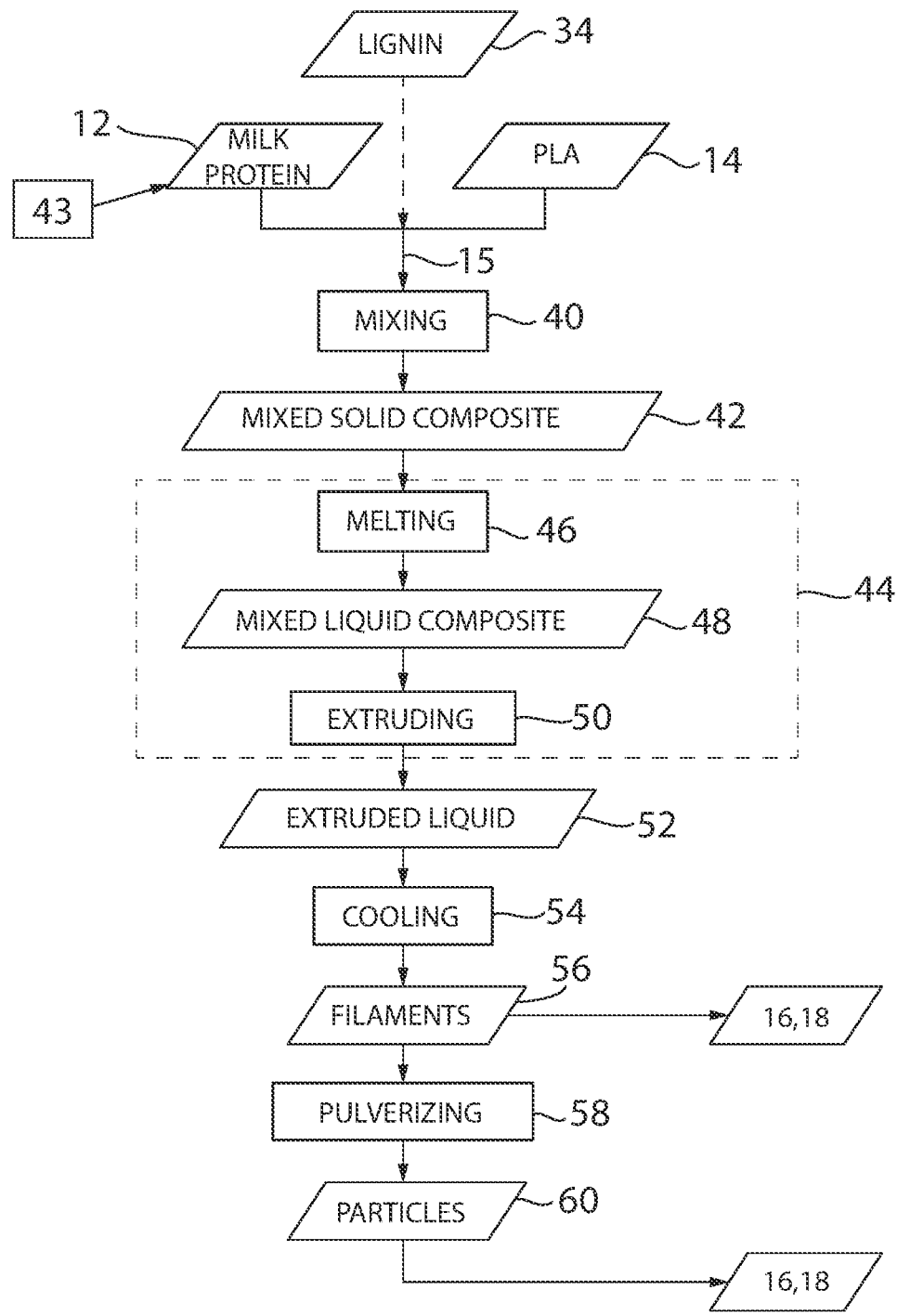
FIG. 3 is a flow chart of a first blending approach for mixing polylactic acid and purified milk protein while both in solid form to produce the composite material of FIG. 1.

Referring to FIG. 3, in a first embodiment of the composite production process, the production of the composite thermoplastic material 15 may generally include a first step in which the milk protein 12 and purified polylactic acid 14 are mixed as solid forms as indicated by process step 40 to form a mixed solid composite 42.

It may be desired that the milk protein 12 and the purified polylactic acid 14 may take a same or similar solid form or shape and a same or similar particle size to promote homogeneity of the mixed solid composite 42. For example, both the milk protein 12 and purified polylactic acid 14 may be pellets, particles, or a powder with similar sized particles. In one nonlimiting example, both the milk protein 12 and purified polylactic acid 14 are particles of about 1.75 mm in diameter.

The relative amounts of milk protein 12 and purified polylactic acid 14 may include desired weight ratios of each component. For example, 0.001-20 wt %, and at least 0.001 wt %, at least 0.01 wt %, at least 0.1 wt %, at least 1 wt %, at least 5 wt %, at least 6 wt %, at least 7 wt %, at least 8 wt %, at least 9 wt %, at least 10 wt %, and less than 20 wt %, less than 15 wt % milk protein 12 loading in purified polylactic acid 14 may be used in the mixed solid composite 42. In some embodiments, the weight ratio of milk protein 12 loading in purified polylactic acid 14 may be 0.001-99 wt % and as much as 99 wt %. The different weight ratios may produce desired material attributes as further described below in the examples.

The greater content of milk protein 12 in the mixed solid composite 42 represents a lower percentage of high priced purified polylactic acid 14 and therefore a lower filament cost (for example, the approximate retail price for PLA filaments is $10 per pound, casein is $3.6-4.5/lb and whey is $0.29-0.33/lb).

Compatibilizers 43 may be added to the milk protein to improve surface interaction with PLA and strength. Compatibilizers 43 may chemically manipulate interface properties of milk protein and polylactic acid thus facilitating their molecular interactions. Compatibilizers 43 may be coupling agents such as ninhydrin, acrylates, anhydrides, disulfides, epoxy, isocyanates, alkyl halides, which can create aldehyde functional groups, and dialdehyde compounds, e.g., glutaraldehyde, which can produce imine crosslinking, remove all the hydrophilic functional groups from proteins, crosslink protein molecules, and increase the carbon chain length.

Chemicals including polyalcohols (an aliphatic or alicyclic molecule characterized by the presence of two or more hydroxyl groups; for example, glycerol, inositol), polyesters, organosolv lignin, stearates, sulfonamides, hydroxybenzoates, phthalates, silanes, and carbohydrates may be used to interact between the milk protein 12 and PLA 14 as compatibilizers 43.

Once the milk protein 12, optionally pre-treated with compatibilizer 43, and the purified polylactic acid 14 are mixed to form the mixed solid composite 42, the mixed solid composite 42 is introduced or fed into a filament extruder 44 which is able to perform melt mixing and extruding steps. The filament extruder 44 may be integrated with the three-dimensional printer 18 or may be a separate component.

The filament extruder 44 may melt the mixed solid composite 42 as indicated by process step 46 using a heater of the filament extruder 44. The mixed solid composite 42 is then melted into a mixed liquid composite 48 which is capable of being extruded from the filament extruder 44 as indicated by process step 50.

After the extrudate 52 exits the filament extruder 44, it is allowed to cool as indicated by process step 54 to form solid filaments 56. The filaments 56 may be used by the printer extruder 16 of the three-dimensional printer 18.

In an alternative embodiment, the solid filaments 56 may be further pulverized as indicated by process step 58 to form solid pellets 60 which may then be used by the printer extruder 16 of the three-dimensional printer 18 implementing fused pellets fabrication (FPF). It is also understood that the solid pellets 60 may be particles or a powder.

Figure 4:
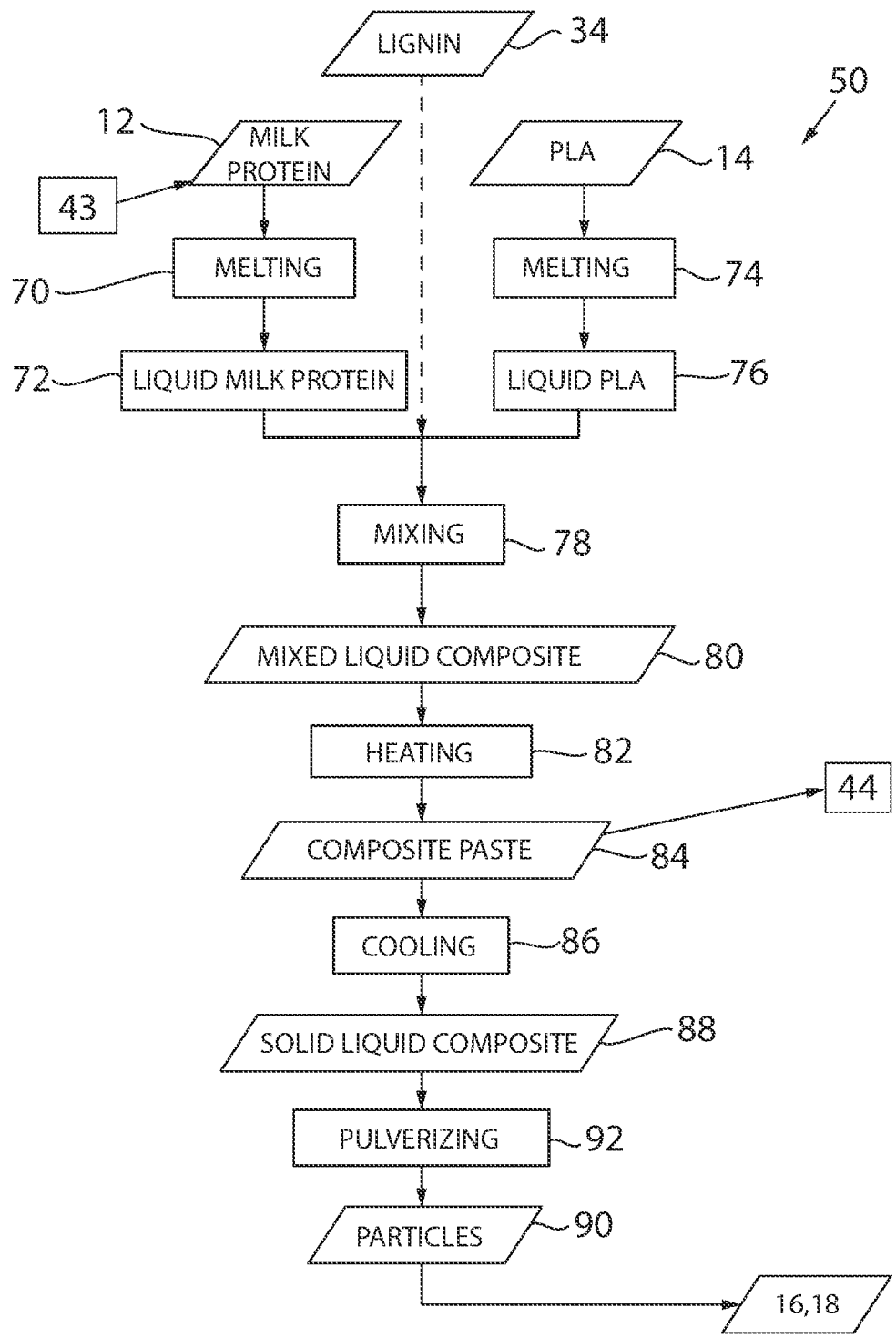
FIG. 4 is a flow chart of a second blending approach for mixing polylactic acid and purified milk protein while both in liquid form to produce the composite material of FIG. 1.

Referring to FIG. 4, in an alternative embodiment of the combining process, the milk protein 12 and purified polylactic acid 14 may be mixed in liquid form as opposed to being mixed in solid form as previously described in FIG. 3.

In this respect the milk protein 12, optionally pre-treated with compatibilizer 43, in solid form may be melted, as indicated by process step 70, to form a molten material 72. Similarly, purified polylactic acid 14 in the form of solid particles may be melted, as indicated by process step 74, to form molten material 76.

Pre-measured amounts of each molten material 72, 76 are mixed together, as indicated by mixing step 78. The mixed liquid composite 80 may include desired weight ratios of each component, as previously described above with respect to FIG. 3. For example, 0.001-20 wt %, and at least 0.001 wt %, at least 0.01 wt %, at least 0.1 wt %, at least 1 wt %, at least 5 wt %, at least 6 wt %, at least 7 wt %, at least 8 wt %, at least 9 wt %, at least 10 wt %, and less than 20 wt %, less than 15 wt % milk protein 12 loading in purified polylactic acid 14 may be used in the mixed liquid composite 80. In some embodiments, the weight ratio of milk protein 12 loading in purified polylactic acid 14 may be 0.001-99 wt % and as much as 99 wt %. The different weight ratios may produce desired material attributes as further described below in the examples.

The mixed liquid composite 80 may be heated as indicated by process step 82 at a desired temperature for a predetermined amount of time to facilitate stirring of the mixed liquid composite 80 into a homogeneous viscous paste 84. For example, the mixed liquid composite 80 may be mixed for about 10-15 minutes at 35 rpm rotating speed at a mixing temperature of 165 to 190 degrees Celsius. The viscous paste 84 may then be allowed to cool and solidify, as indicated by process step 86.

The solid liquid composite 88 may then be pulverized into smaller pellets 90 as indicated by process step 92. The pellets 90 may then be used by the printer extruder 16 of the three-dimensional printer 18 implementing fused pellets fabrication (FPF). It is also understood that the pellets 90 may also be particles or a powder.

It is also understood that in an alternative embodiment the composite viscous paste 84 may be extruded from a filament extruder 44 to form filaments 56 that may be used by the printer extruder 16 of the three-dimensional printer 18 as previously described above with respect to FIG. 3.

Referring again to FIG. 1, when in the form of filaments 56, the filaments may have a diameter of about 1.25-3.0 mm and less than 3.0 mm and less than 2.0 mm and about 1.75 mm and about 2.85 mm. The filaments 56 may have a tensile strength of at least 20 MPa and at least 30 MPa and at least 50 MPa and at least 60 MPa. The filaments 56 are optionally wound around the spool 20 for dispensing the filament 56 into the printer extruder 16. The filament 56 may be white, orange or brown in color because of the natural color of the milk protein 12 and the transparency of polylactic acid 14.

When used in the form of pellets 60, 90, the pellets may have a size of about 1.5 mm to 4 mm and less than 4 mm and less than 2 mm and about 1.75 mm and about 3.6 mm. The pellets 60, 90 are held by the feeding system for dispensing the pellets 60, 90 into the printer extruder 16.

Figure 9:
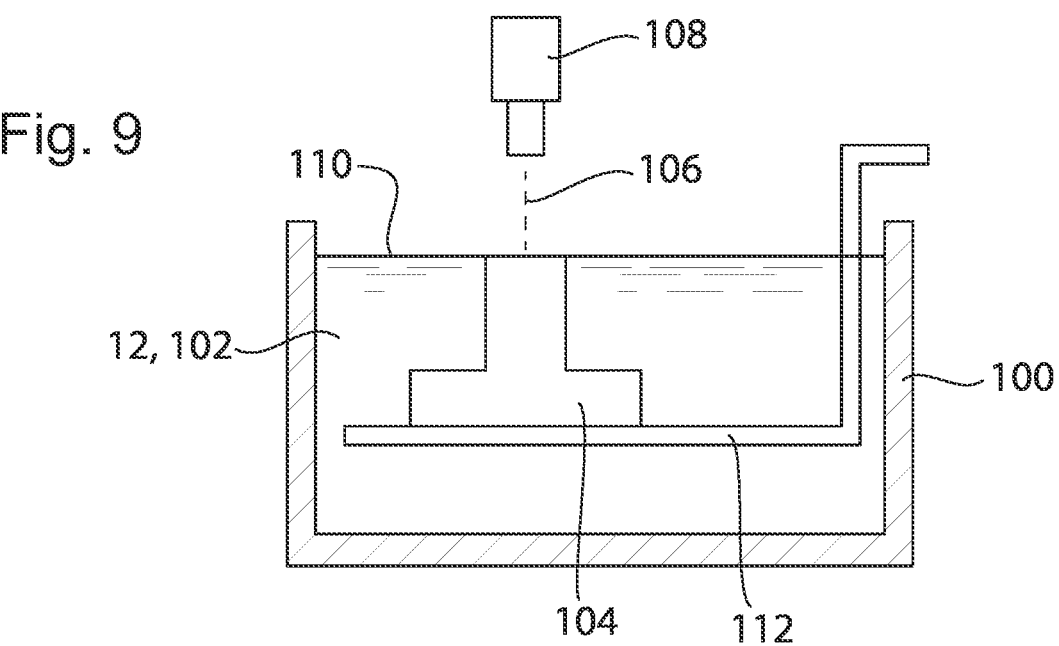
FIG. 9 is a schematic representation of an alternative embodiment of the three-dimensional printing method of the present invention using a vat of photocurable liquid resin composite in a vat photopolymerization three-dimensional printing process.

Referring briefly to FIG. 9, in an alternative embodiment of the present invention, a mixed liquid composite of photopolymer resin 102 and milk protein 12 may be used in vat photopolymerization processes as described with respect to Example 4 below. The photopolymer resin 102 is a polymer that changes its properties when exposed to light, e.g., ultraviolet light or visible region light. The photopolymer resin 102 may be a liquid photocurable resin such that the liquid material hardens into a solid form when exposed to light. The photopolymer resin 102 may include a photopolymerizable monomer, an initiator system (initiates polymerization upon exposure to light), reactive diluents, flexibilizers/plasticizers, and stabilizers.

The flexibility, adhesion, and chemical resistance of the photocurable composite are provided by the functionalized oligomers present in the photocurable composite, for example, epoxides, urethanes, polyethers, or polyesters.

Similar to the composite materials described above, the photocurable composite may include desired weight ratios of milk protein 12 component. For example, 0.001-20 wt %, and at least 0.001 wt %, at least 0.01 wt %, at least 0.1 wt %, at least 1 wt %, at least 5 wt %, at least 6 wt %, at least 7 wt %, at least 8 wt %, at least 9 wt %, and less than 10 wt %, and less than 20 wt % milk protein 12 loading in photopolymer resin.

The following examples are offered for illustrative purposes only and are not intended to limit the scope of the present invention in any way. Various modifications of the invention in addition to those shown and described herein will become apparent to those skilled in the art from the foregoing description and the following examples and fall within the scope of the appended claims.

Example 1: Implementation of Extrusion Techniques to Produce PLA-Casein, PLA-Whey, and PLA-Lignin-Casein Filaments for Fused Filament Fabrication (FFF) 3D Printing Processes Commercially available casein and whey powder 30, 32 may be purchased, sieved, and dried in vacuum oven at 55 degrees Celsius. Alternatively, spoiled milk and yogurt may be used to obtain casein and whey 30, 32.

PLA 14 pellet sizes of 1.8 mm diameters may be purchased and dried in the vacuum oven at 55 degrees Celsius.

The casein or whey powder 30, 32 that are bought commercially and those obtained from spoiled milk and yogurt may be blended respectively with PLA 14 to produce 0.001 wt %, 5 wt %, 10 wt %, and 20 wt % of casein or whey by mass before each mixture is extruded into experimental filaments using a single screw extruder.

The filament 56 may be pelletized and re-extruded a second time to ensure composition homogeneity. Optimal extrusion temperatures would be determined. The filaments 56 may have a diameter between 1.5 and 2 mm and about 1.75 mm.

In alternative embodiments, purified lignin 34 may be blended with the purified casein 30 or whey 32 and purified PLA 14 to produce 0.001-20 wt % and at least 5 wt % and about 5 wt % of casein or whey by mass, and 0.001-50 wt % and at least 30 wt % and at least 40 wt % and about 40 wt % of purified lignin by mass before each mixture is extruded into experimental filaments using a single screw extruder. Similar to above, the filament may be pelletized and re-extruded a second time to ensure composition homogeneity. Optimal extrusion temperatures would be determined. The filaments may have a diameter between 1.5 and 2 mm and about 1.75 mm.

Lignin 34 may be commercially available or produced from an organosolv process. The process of producing purified lignin from an organosolv process is described in U.S. Pat. No. 8,211,189 entitled "Lignin-solvent fuel and method and apparatus for making same" and U.S. Pat. No. 8,465,559 entitled "Lignin-solvent fuel and method and apparatus for making same," each assigned to the present applicant and each of which are hereby incorporated by reference. A process of producing lignin-based bio composites is described in U.S. application Ser. No. 17/048,319, entitled, "Polylactic Acid and Lignin Composite Thermoplastic for 3D Printing," assigned to the present applicant and hereby incorporated by reference.

Milk Protein (Casein or Whey), and Optionally Lignin, with PLA Formulation for 3D Printing

| Components | Weight percent (wt %) |
|---|---|
| Casein, PLA | 0.001-20 wt % casein; Approximately 5 wt %, 10 wt %, or 20 wt % casein |
| Whey, PLA | 0.001-20 wt % casein; Approximately 5 wt %, 10 wt %, or 20 wt % whey |
| Casein, Lignin, PLA | 0.001-20 wt % casein and 0.001-50 wt % lignin; Approximately 5% casein and 40% lignin |

Example 2: Material Samples Fabricated Using Fused Filament Fabrication (FFF) 3D Printing Process Filaments produced may be used to print tensile test specimens for mechanical strength characterization according to ASTM D638 standard. The mechanical strength characterization test results are described below with respect to FIGS. 5 to 8.

Figure 5:
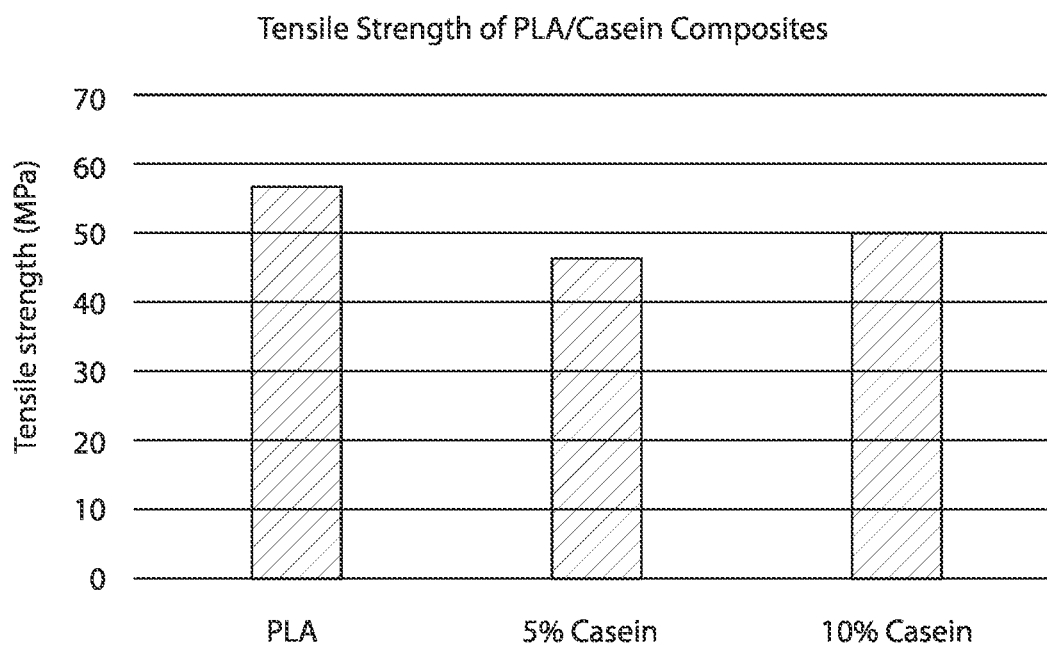
FIG. 5 is a bar graph showing tensile strengths of pure polylactic acid and polylactic acid and milk protein composite material samples using the method of FIG. 1 at different milk protein concentrations.

Referring to FIG. 5, the tensile strength of the PLA-casein filaments at different weight percent casein loading was compared with pure PLA filaments. The tensile strength of the pure PLA filaments was between 50-60 MPa and about 58 MPa, the tensile strength of the PLA-casein filaments with 5 wt % of casein was between 40-50 MPa and about 48 MPa, and the tensile strength of the PLA-casein filaments with 10 wt % of casein was between 50-60 MPa and about 52 MPa. Therefore, the tensile strength of pure PLA filaments was greater than PLA-casein filaments with 10 wt % of casein, and the tensile strength of PLA-casein filaments with 10 wt % of casein was greater than PLA-casein filaments with 5 wt % of casein.

Figure 6:
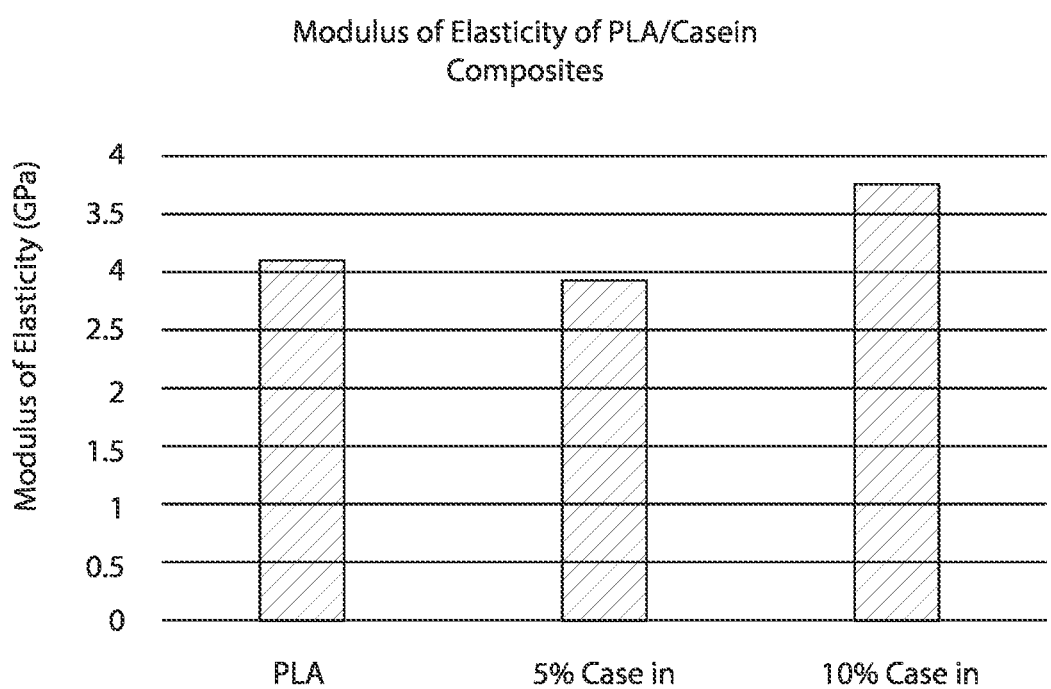
FIG. 6 is a bar graph showing modulus of elasticity of pure polylactic acid and polylactic acid and milk protein composite material samples using the method of FIG. 1 at different milk protein concentrations.

Referring to FIG. 6, the modulus of elasticity of the PLA-casein filaments at different weight percent casein loading was compared with pure PLA filaments. The modulus of elasticity of the pure PLA filaments was between 3-3.5 GPa and about 3.1 GPa, the modulus of elasticity of the PLA-casein filaments with 5 wt % of casein was between 2.5-3 GPa and about 2.9 GPa, and the modulus of elasticity of the PLA-casein filaments with 10 wt % of casein was between 3.5-4 GPa and about 3.8 GPa. Therefore, the modulus of elasticity of PLA-casein filaments with 10 wt % of casein was greater than the modulus of elasticity of PLA filaments, and the modulus of elasticity of PLA filaments was greater than PLA-casein filaments with 5 wt % of casein.

Figure 7:
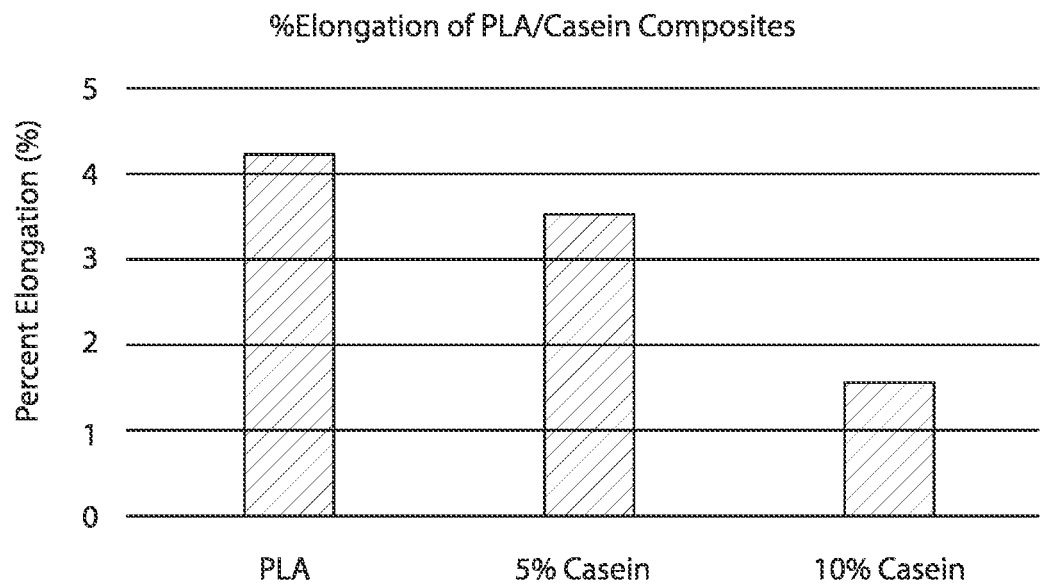
FIG. 7 is a bar graph showing percent elongation of pure polylactic acid and polylactic acid and milk protein composite material samples using the method of FIG. 1 at different milk protein concentrations.

Referring to FIG. 7, the percent elongation of the PLA-casein filaments at different weight percent casein loading was compared with pure PLA filaments. The percent elongation of the pure PLA filaments was between 4-5% and about 4.2%, the percent elongation of the PLA-casein filaments with 5 wt % of casein was between 3-4% and about 3.6%, and the percent elongation of the PLA-casein filaments with 10 wt % of casein was between 1-2% and about 1.6%. Therefore, the percent elongation of PLA was greater than PLA-casein filaments with 5 wt % of casein, and the percent elongation of PLA-casein filaments with 5 wt % of casein was greater than PLA-casein filaments with 10 wt % of casein.

Figure 8:
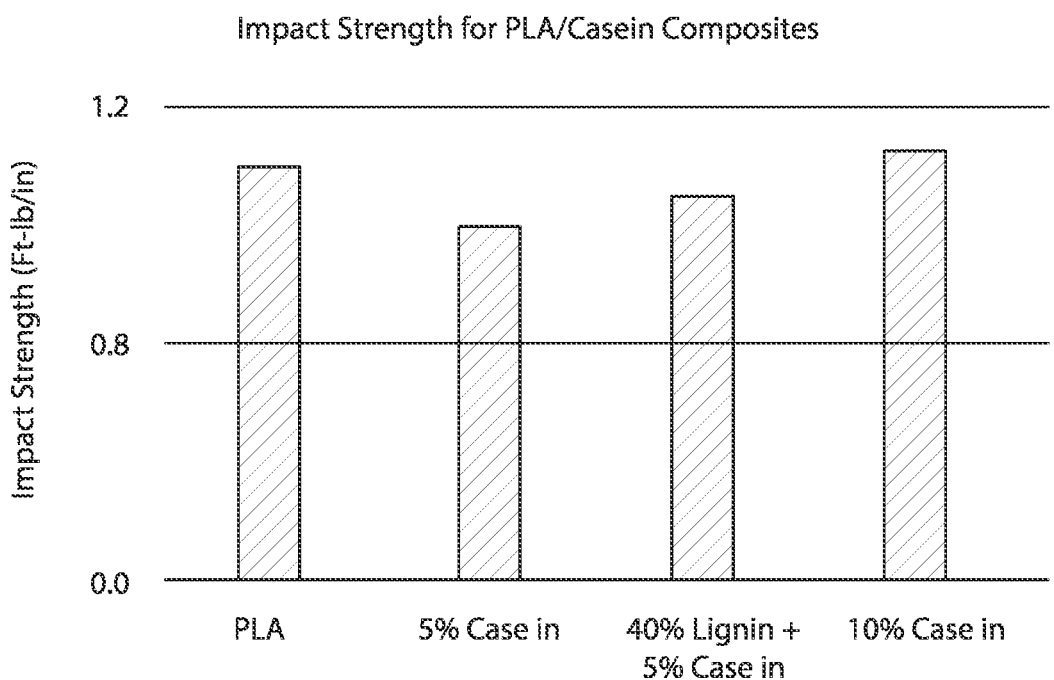
FIG. 8 is a bar graph showing impact strength of pure polylactic acid and polylactic acid and milk protein composite material samples using the method of FIG. 1 at different milk protein concentrations.

Referring to FIG. 8, the impact strength of the PLA-casein filaments at different weight percent casein loading was compared with pure PLA filaments. The impact strength of the pure PLA filaments was about 1.1 ft-lb/in, the impact strength of the PLA-casein filaments with 5 wt % of casein was about 1.0 ft-lb/in, and the impact strength of the PLA-casein filaments with 10 wt % of casein was about 1.1 ft-lb/in. The impact strength of PLA-casein/lignin filaments with 40% lignin and 5% casein was about 1.05 ft-lb/in. Therefore, the impact strength of the PLA filaments and PLA-casein filaments with 10 wt % of casein was greater than the PLA-casein/lignin filaments with 40% lignin and 5% casein, and the PLA-casein/lignin filaments with 40% lignin and 5% casein was greater than the PLA-casein filaments with 5 wt % of casein.

Scanning electron microscope (SEM) was used to observe the compatibility and homogeneity of the component materials. The filaments were well homogenized and were of consistent composition of constituent materials in the extruded filaments. With the color of casein being white and the proposed PLA pellet transparent, the bio composite can be made into any color of choice (white, orange, brown, black) with the use of commercially available dyes. The color could also be determined by the addition of lignin that may make it brown or black.

Example 3: Implementation of Chemical Modification to Increase the Intermolecular Interaction Between the Milk Proteins and PLA in Filament and Increase the Strength of 3D Printed Specimens PLA is a hydrophobic polymer, thus, the surface of milk protein solids may be chemically modified to improve surface interaction with PLA and strength of the bonding.

First, the carboxylic acid functional groups of milk proteins may be modified to produce aldehyde functional groups by treating it with ninhydrin, acrylates, anhydrides, disulfides, epoxy, isocyanates, or alkyl halides. Second, dialdehyde compounds, e.g., glutaraldehyde, can be added to produce imine crosslinking, removing all the hydrophilic functional groups from proteins, crosslinking protein molecules, and increasing the carbon chain length.

The amine and dithiol functional groups of milk proteins may be modified to increase ester functional groups in the protein. Chemicals such as acrylates, anhydrides, disulfides, epoxy, isocyanates, alkyl halides can target either amine or disulfide groups in proteins to achieve protein modification.

The chemically modified milk protein solid may be filtered, washed, dried, and pulverized before being extruded with PLA and then 3D printed, as described in Example 1 above. The chemically modified milk protein may be more compatible with PLA and thus increase the strength of the three-dimensional printed specimens verified from tensile testing and SEM fractography.

Example 4: Material Samples Fabricated Using Vat Photopolymerization 3D Printing Process Referring to FIG. 9, vat photopolymerization is a method that uses a vat 100 of liquid photopolymer resin 102, out of which a three-dimensional printed object 104 is constructed layer by layer. The clear liquid photopolymer resin 102 is photocurable and is converted to a solid object 104 when irradiated by ultraviolet (UV) light 106 from a laser 108 or a suitable light source where the UV light 106 is directed across the top surface 110 of the resin 102 with the use of mirrors to cure or harden the resin 102 as the object is built up from the build platform 112.

Generally, in a first step, the build platform 112 is lowered from the top of the resin vat 100 downwards into the resin vat 100 to a depth that is commensurate with a layer thickness. Second, a UV light 106 cures the photopolymer resin 102 at the top layer. The build platform 110 continues to move downwards and additional layers are built on top of the previous layer. Optionally, in a third step, a blade moves between layers to provide a smooth resin base to build the next layer on. Fourth, after completion, the resin vat 100 is drained of photopolymer resin 102 and the object 104 is removed or the build platform 112 raised to enable removal of the fabricated part.

Commercially available casein and whey powder 30, 32 may be purchased, sieved, and dried in vacuum oven at 55 degrees Celsius. Alternatively, spoiled milk and yogurt may be used to obtain casein and whey 30, 32.

Photopolymer resin contains a photopolymerizable monomer, an initiator system (initiates polymerization upon exposure to light), and a polymer (the binder). Photopolymer resin may be bought commercially in liquid form, for example, Elegoo "Standard Photopolymer Resin" and eSUN "General-Purpose Photopolymer Resin."

The casein or whey powder 30, 32 that are bought commercially and those obtained from spoiled milk and yogurt may be blended respectively with the liquid photopolymer resin to produce 0 wt %, 5 wt %, and 10 wt % of casein or whey by mass. The mixture may be placed in the vat for vat photopolymerization and cured as understood in the art. The curing time may be between 15-60 minutes.

Milk Protein (Casein or Whey) with Photopolymer Resin Formulation for 3D Printing

| Components | Weight percent (wt %) |
|---|---|
| Casein, Photopolymer resin | 0.001-20 wt % casein; Approximately 0 wt %, 5 wt %, or 10 wt % casein |
| Whey, Photopolymer resin | 0.001-20 wt % casein; Approximately 0 wt %, 5 wt %, or 10 wt % whey |
| Cure Time | 15-60 minutes; Approximately 15, 30, or 60 minutes |

Scanning electron microscope (SEM) may also be used to verify the density and quality of the 3D printed specimen and fracture morphology.

Figure 10:
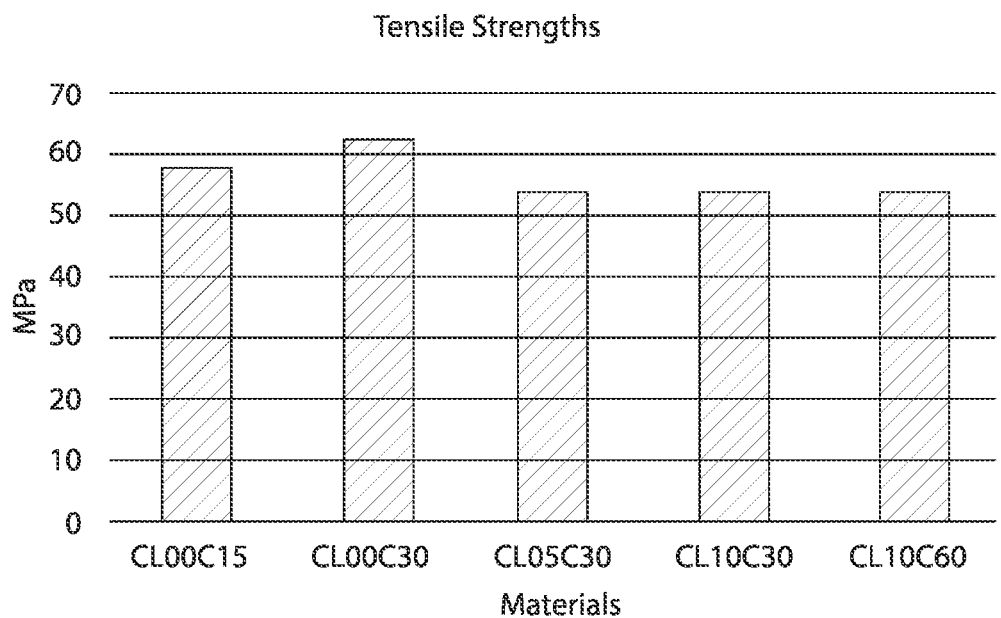
FIG. 10 is a bar graph showing tensile strengths of liquid resin and milk protein composite material samples using the method of FIG. 9 at different milk protein concentrations and cure times (CL00C15=Clear liquid resin with no casein content fabricated and cured for 15 minutes; CL00C30=Clear liquid resin with no casein content fabricated and cured for 30 minutes; CL05C30=Clear liquid resin with 5 wt % casein fabricated and cured for 30 minutes; CL10CL30=Clear liquid resin with 10 wt % casein fabricated and cured for 30 minutes; CL10C60=Clear liquid resin with 10 wt % casein fabricated and cured for 60 minutes)

Referring to FIG. 10, the tensile strength of the 3D printed specimens with different casein weight percentages and cure times were compared. The tensile strength of a 3D printed specimen of clear liquid resin with no casein content fabricated and cured for 15 minutes was between 50-60 MPa and about 58 MPa. The tensile strength of a 3D printed specimen of clear liquid resin with no casein content fabricated and cured for 30 minutes was between 60-70 MPa and about 62 MPa. The tensile strength of a 3D printed specimen of clear liquid resin with 5 wt % casein fabricated and cured for 30 minutes was between 50-60 MPa and about 54 MPa. The tensile strength of a 3D printed specimen of clear liquid resin with 10 wt % casein fabricated and cured for 30 minutes was between 50-60 MPa and about 54 MPa. The tensile strength of a 3D printed specimen of clear liquid resin with 10 wt % casein fabricated and cured for 60 minutes was between 50-60 MPa and about 54 MPa.

Therefore, the tensile strength of the 3D printed specimen of clear liquid resin with no casein content fabricated and cured for 30 minutes was greater than 3D printed specimen of clear liquid resin with no casein content fabricated and cured for 15 minutes, and the tensile strength of the 3D printed specimen of clear liquid resin with no casein content fabricated and cured for 15 minutes was greater than the 3D printed specimen of clear liquid resin with 5 wt % casein fabricated and cured for 30 minutes, the 3D printed specimen of clear liquid resin with 10 wt % casein fabricated and cured for 30 minutes, and the 3D printed specimen of clear liquid resin with 10 wt % casein fabricated and cured for 60 minutes.

Figure 11:
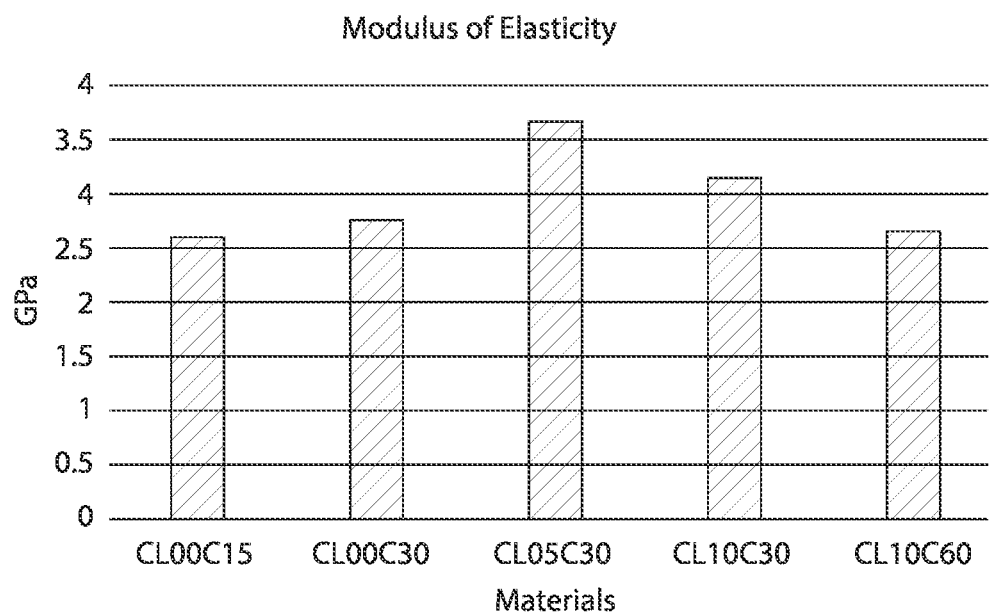
FIG. 11 is a bar graph showing modulus of elasticity of liquid resin and milk protein composite material samples using the method of FIG. 9 at different milk protein concentrations and cure times (CL00C15=Clear liquid resin with no casein content fabricated and cured for 15 minutes; CL00C30=Clear liquid resin with no casein content fabricated and cured for 30 minutes; CL05C30=Clear liquid resin with 5 wt % casein fabricated and cured for 30 minutes; CL10CL30=Clear liquid resin with 10 wt % casein fabricated and cured for 30 minutes; CL10C60=Clear liquid resin with 10 wt % casein fabricated and cured for 60 minutes)

Referring to FIG. 11, the modulus of elasticity of the 3D printed specimens with different casein weight percentages and cure times were compared. The modulus of elasticity of a 3D printed specimen of clear liquid resin with no casein content fabricated and cured for 15 minutes was between 2.5-3 GPa and about 2.6 GPa. The modulus of elasticity of a 3D printed specimen of clear liquid resin with no casein content fabricated and cured for 30 minutes was between 2.5-3 GPa and about 2.75 MPa. The modulus of elasticity of a 3D printed specimen of clear liquid resin with 5 wt % casein fabricated and cured for 30 minutes was between 3.5-4 GPa and about 3.7 GPa. The modulus of elasticity of a 3D printed specimen of clear liquid resin with 10 wt % casein fabricated and cured for 30 minutes was between 3-3.5 GPa and about 3.1 GPa. The modulus of elasticity of a 3D printed specimen of clear liquid resin with 10 wt % casein fabricated and cured for 60 minutes was between 2.5-3 GPa and about 2.7 MPa.

Therefore, the modulus of elasticity of the 3D printed specimen of clear liquid resin with 5 wt % casein fabricated and cured for 30 minutes was greater than the 3D printed specimen of clear liquid resin with 10 wt % casein fabricated and cured for 30 minutes, and the modulus of elasticity of the 3D printed specimen of clear liquid resin with 10 wt % casein fabricated and cured for 30 minutes was greater than the 3D printed specimen of clear liquid resin with no casein content fabricated and cured for 30 minutes, and the 3D printed specimen of clear liquid resin with no casein content fabricated and cured for 30 minutes was greater than the 3D printed specimen of clear liquid resin with 10 wt % casein fabricated and cured for 60 minutes, and the 3D printed specimen of clear liquid resin with 10 wt % casein fabricated and cured for 60 minutes was greater than the 3D printed specimen of clear liquid resin with no casein content fabricated and cured for 15 minutes.

Figure 12:
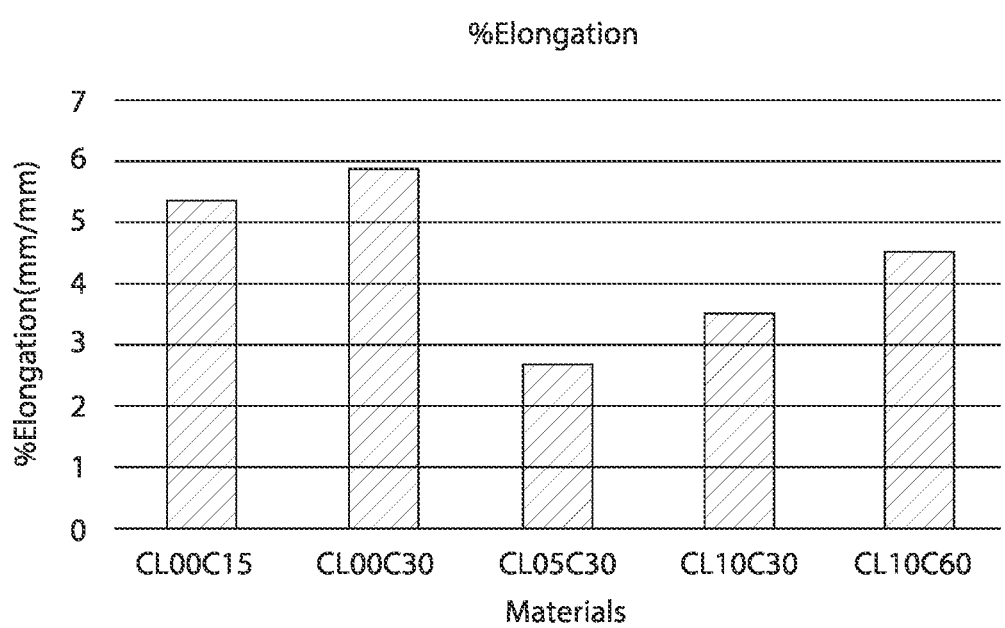
FIG. 12 is a bar graph showing percent elongation of liquid resin and milk protein composite material samples using the method of FIG. 9 at different milk protein concentrations and cure times (CL00C15=Clear liquid resin with no casein content fabricated and cured for 15 minutes; CL00C30=Clear liquid resin with no casein content fabricated and cured for 30 minutes; CL05C30=Clear liquid resin with 5 wt % casein fabricated and cured for 30 minutes; CL10CL30=Clear liquid resin with 10 wt % casein fabricated and cured for 30 minutes; CL10C60=Clear liquid resin with 10 wt % casein fabricated and cured for 60 minutes).

Referring to FIG. 12, the percent elongation of the 3D printed specimens of resin with different casein weight percentages and cure times were compared. The percent elongation of a 3D printed specimen of clear liquid resin with no casein content fabricated and cured for 15 minutes was between 5-6 mm/mm and about 5.4 mm/mm. The percent elongation of a 3D printed specimen of clear liquid resin with no casein content fabricated and cured for 30 minutes was between 5-6 mm/mm and about 5.9 mm/mm. The percent elongation of a 3D printed specimen of clear liquid resin with 5 wt % casein fabricated and cured for 30 minutes was between 2-3 mm/mm and about 2.8 mm/mm. The percent elongation of a 3D printed specimen of clear liquid resin with 10 wt % casein fabricated and cured for 30 minutes was between 3-4 mm/mm and about 3.5 mm/mm. The percent elongation of a 3D printed specimen of clear liquid resin with 10 wt % casein fabricated and cured for 60 minutes was between 4-5 mm/mm and about 4.5 mm/mm.

Therefore, the percent elongation of the 3D printed specimen of clear liquid resin with no casein content fabricated and cured for 30 minutes was greater than the 3D printed specimen of clear liquid resin with no casein content fabricated and cured for 15 minutes, the percent elongation of the 3D printed specimen of clear liquid resin with no casein content fabricated and cured for 15 minutes was greater than the 3D printed specimen of clear liquid resin with 10 wt % casein fabricated and cured for 60 minutes, the percent elongation of the 3D printed specimen of clear liquid resin with 10 wt % casein fabricated and cured for 60 minutes was greater than 3D printed specimen of clear liquid resin with 10 wt % casein fabricated and cured for 30 minutes, and the percent elongation of the 3D printed specimen of clear liquid resin with 10 wt % casein fabricated and cured for 30 minutes was greater than the 3D printed specimen of clear liquid resin with 5 wt % casein fabricated and cured for 30 minutes.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A 3-D printer filament comprising a thermoplastic material including:
   a first amount of polylactic acid;
   wherein the amount of polylactic acid is greater than 30 weight percent of
   the thermoplastic material; and a second amount of milk protein blended in the purified polylactic acid;
   wherein the milk protein is greater than 10 weight percent of the thermoplastic material and the polylactic acid is greater than the milk protein by weight percent.

2. The 3D printer filament of claim 1 wherein the milk protein is casein.

3. The 3D printer filament of claim 1 wherein the milk protein is whey.

4. The 3D printer filament of claim 1 further comprising a third amount of lignin.

5. The 3D printer filament of claim 4 wherein the lignin is between 0.001 to 50 weight percent.

6. The 3D printer filament of claim 1 wherein the filament has a diameter of less than 3.0 mm.

7. The 3D printer filament of claim 1 wherein the filament has a diameter less than 2.0 mm.

8. The 3D printer filament of claim 1 wherein the filament has a tensile strength of at least 20 MPa.

9. The 3D printer filament of claim 1 wherein the composition is white, orange or brown in color.

10. The 3D printer filament of claim 1 wherein the composition is composed of only renewable materials.

11. A composition of a photocurable liquid resin comprising:
    a first amount of photopolymer resin; and
    a second amount of purified milk protein blended in the purified polylactic acid
    wherein the purified milk protein is between 0.001 and 20 weight percent.

12. The 3-D printer filament of claim 1 wherein the weight percent of PLA is greater than 80%.

* * * * *